United States Patent Office 3,540,892
Patented Nov. 17, 1970

3,540,892
PROCESS FOR FLAMEPROOFING COMBUSTIBLE MATERIALS
Edwin W. Lard, Bowie, and Carl W. Orgell, Catonsville, Md., assignors to W. R. Grace & Co., New York, N.Y., a corporation of Connecticut
No Drawing. Filed May 6, 1968, Ser. No. 726,999
Int. Cl. C09d 5/18
U.S. Cl. 106—15             2 Claims

ABSTRACT OF THE DISCLOSURE

A process for flameproofing combustible materials such as paper, fabrics, etc., by depositing a coating of vermiculite on the surface of the combustible material by dipping the material in a slurry of vermiculite crystals in an aqueous solution of a soluble inorganic salt, drying, and recovering the flameproof product.

---

The present invention relates to a method for flameproofing combustible materials by coating said materials with vermiculite.

The term vermiculite used herein refers to the group of rock forming mineral species characterized by a layer lattice structure in which the silicate layer units have a thickness of approximately 10 Angstroms. The main elements present in the layer are magnesium, aluminum, silicon, and oxygen with the layers being separated by one of two sheets of water molecules associated with cations such as magnesium, calcium, sodium, and hydrogen. The layers have considerable lateral extent relative to the thickness of the basic 10 Angstrom unit layer. The term vermiculite, as used herein, therefore, includes minerals consisting wholly or largely of vermiculite or minerals of mixed layer type containing vermiculite layers as important constituents, such as hydrobiotites, chlorite vermiculites, but does not include minerals of the montmorillonite group.

In the few cases where it is necessary or desirable to impart a degree of water insensitivity to the coating, the vermiculite is treated with lithium chloride to prepare the coating suspension. A degree of water insensitivity is imparted when the vermiculite suspension is prepared in a lithium salt solution and flocculated with an acid.

In most cases, however, water insensitivity is of only secondary importance and the coating suspension may be made up in a solution of a soluble inorganic salt of sodium, calcium, magnesium, aluminum, etc. Although the chloride is preferred, the nitrate, sulfate, phosphate, etc., give satisfactory results in most cases.

When the coating is deposited from a lithium chloride suspension, the slurry, with which the flammable materials are treated, is prepared as folows: The vermiculite is soaked in an aqueous salt (NaCl) solution and then washed with water. Following this, the vermiculite is steeped for an extended period of time in a concentrated aqueous solution of a lithium salt. The treated vermiculite is then washed with water and allowed to stand in water with the consequent swelling of the vermiculite ore. The swelling or expansion of the vermiculite is many-fold and takes place along the axis perpendicular to the basal plane in the mineral crystal. This is probably due to the treatment of the ore previously described in which an ion exchange takes place between the preferred monovalent or divalent cations and the exchangeable cations of the vermiculite ore, thus breaking and forming new bonds and generally weakening the binding forces holding the vermiculite platelets together. The washing and subsequent soaking weakens the structure and causes osmotic swelling of the crystalline structure and allows it to be pulled apart, or partially delaminated by a vigorous agitation. The partially delaminated platelets may be further reduced in particle size by comminuting in a colloid mill or similar grinding-shearing apparatus resulting in a water suspension of vermiculite platelets. At this point, the total solid content of vermiculite suspension is adjusted to approximately 5 to 20, preferably 7 to 12, weight percent. This suspension is used as our flameproof composition. The most convenient method of insuring adherence of the vermiculite to the combustible material is by dipping the fabric, paper, or other material to be flameproofed in this vermiculite slurry and allowing it to dry.

Obviously, the coating can also be applied using other techniques, such as, spraying, painting, etc. The fireproofed product has a coating of vermiculite about 1 to 4 mils thick with a coating of vermiculite about 2 mils thick being preferred since the addition of more vermiculite does not appreciably improve the properties of the product. The exceptional flameproofing characteristics of the product of our novel process is demonstrated by the wide variety of materials used. Good results are obtained when this fine suspension of vermiculite is applied to cotton cloth, nylon net, close and loosely woven nylon filter cloth and paper toweling. After these products have been treated and dried, there is no tendency for flame to propagate in any of the materials and if a flame was present, it was, in fact, extinguished after a short contact with the treated product.

Many inorganic salts have been used previously to inhibit the burning of textiles and other flammable materials. However, the required quantity is usually sufficient to cause the material to become stiff. They are also characterized by an undesirable increase in weight and a loss in resilience in the finished product. Some of these compounds also cause a loss of tensile strength of the material being treated.

Treatment with our novel flameproofing composition does not reduce the tensile strength of the fabrics or other materials and because they are applied as very thin coats, in the order of about 2 mils, they do not appreciably affect the hand or resilience of the fabric or other materials.

Our invention is further illustrated by the following specific nonlimiting examples.

EXAMPLE I

A 400 gram sample of No. 5 vermiculite ore was steeped for 24 hours in 260 ml. of a 20% aqueous sodium chloride solution. The treated vermiculite ore was then diluted with an amount of water sufficient to form a slurry that contained about 7 to 10 weight percent solids. This slurry was used as a flameproofing composition. A 1 inch strip of nylon cloth, 5 inches in length, was dipped in the slurry prepared by the method described above and dried. This treatment resulted in a 63% loading of the nylon cloth, that is, the weight of the cloth increased 63%.

EXAMPLE II

Strips of cellulose towel 1 inch wide and 5 inches in length were coated with the material prepared according to the method described in Example I. The coating was effected by dipping the sample into a slurry of the treated vermiculite. The sample strips were dried and weighed. This treatment resulted in a 300% loading of the towel.

EXAMPLE III

In additional runs, cotton cloth 1 inch long and 5 inches in width and absorbent paper having the same dimensions were treated by dipping in the vermiculite slurry. On drying, each of these materials had 100% loading of the vermiculite.

EXAMPLE IV

The strips prepared according to the methods described in Examples I–III were tested for flammability by suspending the strips with the longer dimension held vertically. A small gas flame about ¼ to ½ inch long from a fine glass tip was then played for about 20 seconds at the lower end of the strip. Observations were made with respect to: (a) ease of ignition, (b) ease of propagation or lack of propagation of the flame, and (c) tendency to afterglow.

The following table summarizes these properties with respect to the compositions made by the methods of Examples I, II, and III inclusive.

TABLE I

|  | Untreated control | Product of Example | | |
|---|---|---|---|---|
|  |  | I | II | III |
| Ease of ignition | Easy | DNC¹ | DNC | DNC |
| Propagation of flame | Rapid | None | None | None. |
| Afterglow tendency | Appreciable | do | do | Do. |

¹ DNC—Did not catch.

It is apparent from these data that the vermiculite is an effective flame retardant for cotton, cellulose, and similar combustible materials.

Obviously, many modifications and variations of the invention may be made without departing from the essence and scope thereof and only such limitations should be applied as are indicated in the appended claims.

We claim:

1. An improved method of flameproofing a combustible material and making it insensitive to water by coating said material with vermiculite in an amount such that 0.5 to 3 times the weight of the combustible material is vermiculite, which comprises:
   (a) soaking vermiculite in an aqueous sodium chloride solution in a concentration of approximately 20 percent,
   (b) washing said vermiculite with water,
   (c) steeping said vermiculite in a concentrated lithium chloride solution,
   (d) washing treated vermiculite with water,
   (e) exfoliating vermiculite with water,
   (f) adjusting total solid content of vermiculite suspension to approximately 5–20 weight percent,
   (g) dipping combustible material to be flameproofed into said suspension,
   (h) drying and recovering the flameproofed, water insensitive product.

2. The process according to claim 1 wherein the combustible material is paper, cotton, cloth or a cloth prepared from a synthetic fiber.

References Cited

UNITED STATES PATENTS

| 2,125,286 | 8/1938 | Fletcher. | |
| 2,393,874 | 1/1946 | Trent | 106—15 XR |
| 2,442,911 | 6/1948 | Trent et al. | 106—15 XR |
| 2,756,159 | 7/1956 | Kendall et al. | 106—15 XR |
| 3,062,753 | 11/1962 | Hayes | 252—378 |

JULIUS FROME, Primary Examiner

L. B. HAYES, Assistant Examiner

U.S. Cl. X.R.

117—136, 138, 143, 152; 252—8.1